(12) United States Patent
Nachnani et al.

(10) Patent No.: US 8,521,758 B2
(45) Date of Patent: Aug. 27, 2013

(54) SYSTEM AND METHOD OF MATCHING AND MERGING RECORDS

(75) Inventors: Pawan Nachnani, Newark, CA (US); Arun K. Jagota, Sunnyvale, CA (US)

(73) Assignee: salesforce.com, inc., San Francisco, CA (US)

(*) Notice: Subject to any disclaimer, the term of this patent is extended or adjusted under 35 U.S.C. 154(b) by 81 days.

(21) Appl. No.: 13/008,853

(22) Filed: Jan. 18, 2011

(65) Prior Publication Data

US 2012/0023107 A1 Jan. 26, 2012

Related U.S. Application Data

(60) Provisional application No. 61/295,672, filed on Jan. 15, 2010.

(51) Int. Cl.
*G06F 17/30* (2006.01)
*G06F 17/00* (2006.01)

(52) U.S. Cl.
USPC .......................................... 707/758; 707/769

(58) Field of Classification Search
USPC ................................................... 707/758, 769
See application file for complete search history.

(56) References Cited

U.S. PATENT DOCUMENTS

| | | | |
|---|---|---|---|
| 7,634,464 B2 * | 12/2009 | Chen et al. ............................ 1/1 |
| 2004/0260694 A1 * | 12/2004 | Chaudhuri et al. ............... 707/5 |
| 2005/0027717 A1 * | 2/2005 | Koudas et al. ................ 707/100 |
| 2005/0154615 A1 * | 7/2005 | Rotter et al. ...................... 705/3 |

* cited by examiner

*Primary Examiner* — Yicun Wu
(74) *Attorney, Agent, or Firm* — Dergosits & Noah LLP; Todd A. Noah

(57) ABSTRACT

A system and method of matching and merging records is disclosed herein. Embodiments comprise receiving, a plurality of records from a feed, wherein a record in the plurality of records from the feed may be either partial or complete. A processor executes fuzzy matching logic to determine whether one or more records in the plurality of records from the feed match an existing record. The processor then executes a merged of the one or more matching records with the existing record to form a merged composite record. Finally, the merged composite record is stored.

24 Claims, 5 Drawing Sheets

SYSTEM AND METHOD OF MATCHING AND MERGING RECORDS

CROSS-REFERENCES TO RELATED APPLICATIONS

The present application claims benefit under 35 U.S.C. §119(e) of U.S. provisional Application No. 61/295,672, filed on Jan. 15, 2010, entitled "System and Method of Matching Records," the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to database systems, and more particularly to implementing systems and methods of matching and merging records.

The subject matter discussed in the background section may not be assumed to be prior art merely as a result of its mention in the background section. Similarly, a problem mentioned in the background section or associated with the subject matter of the background section may not be assumed to have been previously recognized in the prior art. The subject matter in the background section merely represents different approaches, which in and of themselves may also be inventions.

Using present information management systems (e.g., customer relationship management, or CRM, systems), it is difficult to track updates to information (e.g., related to contacts or companies) and to ensure the quality of stored information. For example, as an employee moves from one company to another, it is a nontrivial task to ensure not only that information related to the employee, the former company, and the new company is up to date, complete, coherent, and of high quality, but also that duplicate records and inconsistent records are avoided and/or purged.

Therefore it is desirable to provide systems and methods that overcome the above and other problems.

SUMMARY

Embodiments described herein provides systems, apparatus, and methods for matching and merging records. Embodiments enable logical and efficient integration of information updates and enforce compliance with information quality standards.

Some embodiments comprise receiving, a plurality of records from a feed, wherein a record in the plurality of records from the feed may be either partial or complete. A processor executes fuzzy matching logic to determine whether one or more records in the plurality of records from the feed match an existing record. The processor then executes a merged of the one or more matching records with the existing record to form a merged composite record. Finally, the merged composite record is stored.

In some embodiments, the existing record is associated with a cluster, and the method further comprises associating the one or more matching records with the cluster.

In some embodiments, fuzzy matching comprises determining that both the identified one or more records and the existing record are associated with the same contact. In some embodiments, fuzzy matching comprises determining that both the identified one or more records and the existing record are associated with the same company. In some embodiments, fuzzy matching comprises determining that the identified one or more records are associated with a contact, that the existing record is associated with a company, and that the contact is associated with the company.

In some embodiments, the fuzzy matching logic incorporates use of normalized fields and/or record features.

In some embodiments, the merged composite record is analyzed to determine whether it is incomplete, and, if so, the merged composite record is enriched using available information.

In some embodiments, a weighted confidence score is calculated for a feature of the composite record. In some embodiments, a feature of the composite record may comprise recency, title rank, title quality, domain-specific email pattern, domain-independent email pattern, phone number quality, first name quality, last name quality, or area code-state consistency. In some embodiments, an overall confidence score is calculated for the merged composite record, wherein the overall confidence score for the merged composite record is based on weighted confidence scores for one or more features of the merged composite record, and if the overall confidence score meets a predetermined threshold, the merged composite record is designated as high-quality. The high-quality merged composite record may then be stored in persistent storage, such as a database.

Other embodiments of the invention are directed to systems and computer readable media associated with methods described herein.

While the present invention is described with reference to an embodiment in which techniques for matching and merging records in an on-demand enterprise services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DEFINITIONS

Figure 1:
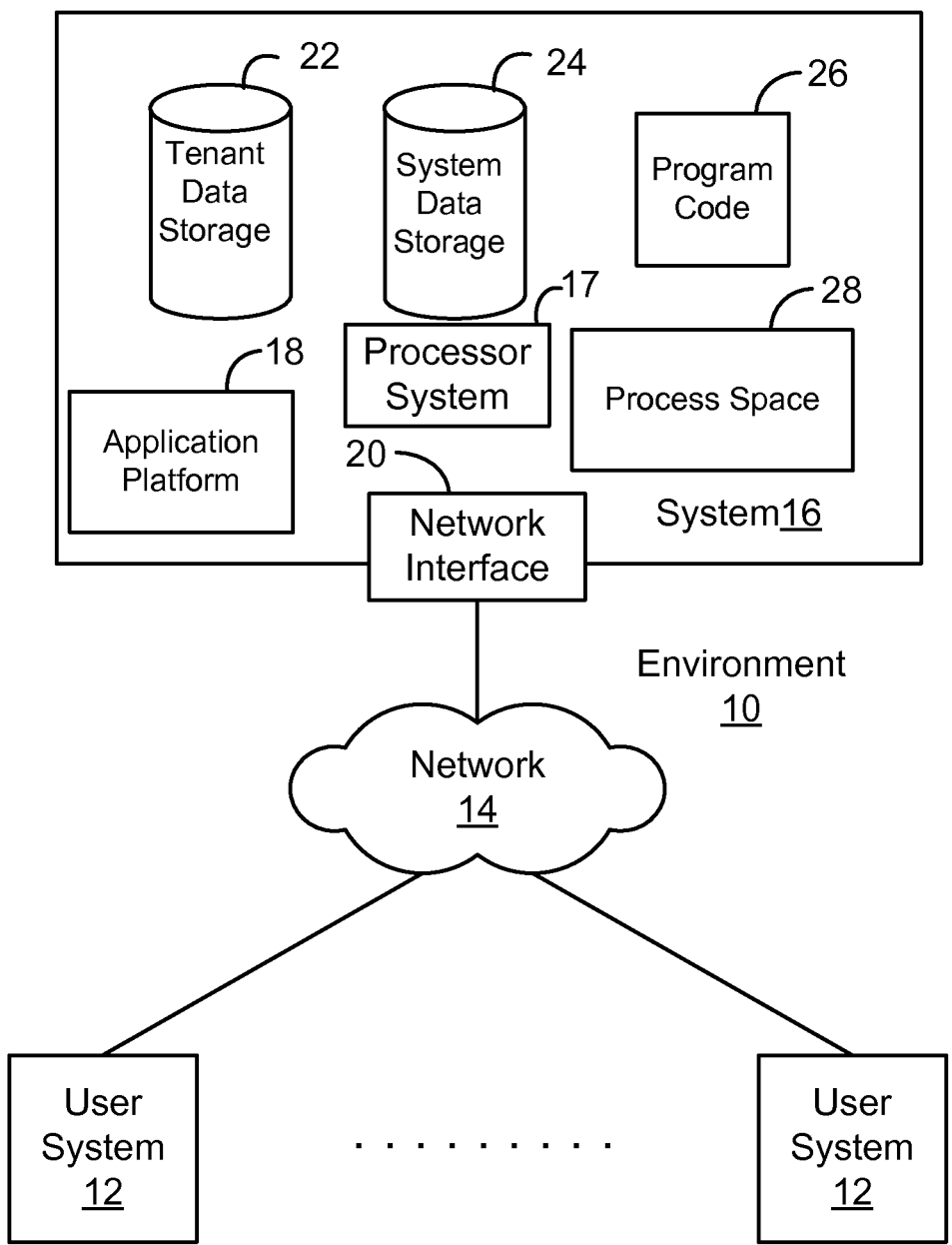
FIG. 1 illustrates a block diagram of an example of an environment wherein some embodiments described herein might be used.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers. As used herein, the term "query plan" refers to a set of steps used to access information in a database system.

As used herein, the term "record" refers to an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g., a possible sale) with an existing partner, or a project that the user is trying to get. In one embodiment implementing a multi-tenant database, all of the records for the tenants have an identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

As used herein, the term "feed" includes a combination (e.g., a list) of feed items. As user herein, the term "feed item" (or feed element) refers to information about a user ("profile feed") of the database or about a record ("record feed") in the database. A user following the user or record can receive the associated feed items. The feed items from all of the followed users and records can be combined into a single feed for the user.

As examples, a "feed item" can be a message and story (also called a feed tracked change). A feed can be a combination of messages and stories. Messages include text created by a user, and may include other data as well. Examples of messages include posts, status updates, and comments. Messages can be created for a user's profile or for a record. Posts can be created by various users, potentially any user, although some restrictions can be applied. As an example, posts can be made to a wall section of a user's profile (which can include a number of recent posts) or a section of a record that includes multiple posts. The posts can be organized in chronological order. In contrast to a post, a status update changes a status of a user and is made by that user. Other similar sections of a user's profile can also include an "About" section. A record can also have a status, whose update can be restricted to the owner of the record. The owner can be a single user, multiple users, or a group. In one embodiment, there is only one status for a record. In one embodiment, a comment can be made on any feed item. In another embodiment, comments are organized as a list explicitly tied to a particular story, post, or status update. In this embodiment, comments may not be listed in the first layer (in a hierarchical sense) of feed items, but listed as a second layer branching from a particular first layer feed item.

As used herein, an "entity feed" or "record feed" refers to a feed of feed items about a particular record in the database, such as stories about changes to the record and posts made by users about the record. An entity feed can be composed of any type of feed item. Such a feed can be displayed on a page (e.g., a web page) associated with the record (e.g., a home page of the record). As used herein, a "contact feed" is a feed of feed items about a particular user. In one embodiment, the feed items for a contact feed are posts and comments that other users make about or send to the particular user, and status updates made by the user. Such a profile feed can be displayed on a page associated with the particular user. In another embodiment, feed items in a profile feed could include posts made by the particular user and feed tracked changes (stories) initiated based on actions of the particular user.

DETAILED DESCRIPTION

I. General Overview

Systems, apparatus, and methods are described for matching and merging records. Such embodiments can provide more efficient use of a database system. For instance, as an employee moves from one company to another, it is a non-trivial task to ensure not only that information related to the employee, the former company, and the new company is up to date, complete, coherent, and of high quality, but also that duplicate records and inconsistent records are avoided and/or purged. Embodiments enable logical and efficient integration of information updates and enforce compliance with information quality standards.

By way of example, a user can submit to a feed an information update about an existing contact in the database system (e.g., new job title after a promotion). Once the information has been submitted to the feed, the database system can then automatically collect the updated information from the feed, match the name of the employee with the updated title to an existing record for the employee in the database system, and logically and efficiently merge the updated information with the existing record, without creating duplicate records or inconsistencies.

II. System Overview

FIG. 1 illustrates a block diagram of an environment 10 wherein an on-demand database service might be used. Environment 10 may include user systems 12, network 14, and system 16, which may comprise processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level (profile type) may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it may be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it may be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It may also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
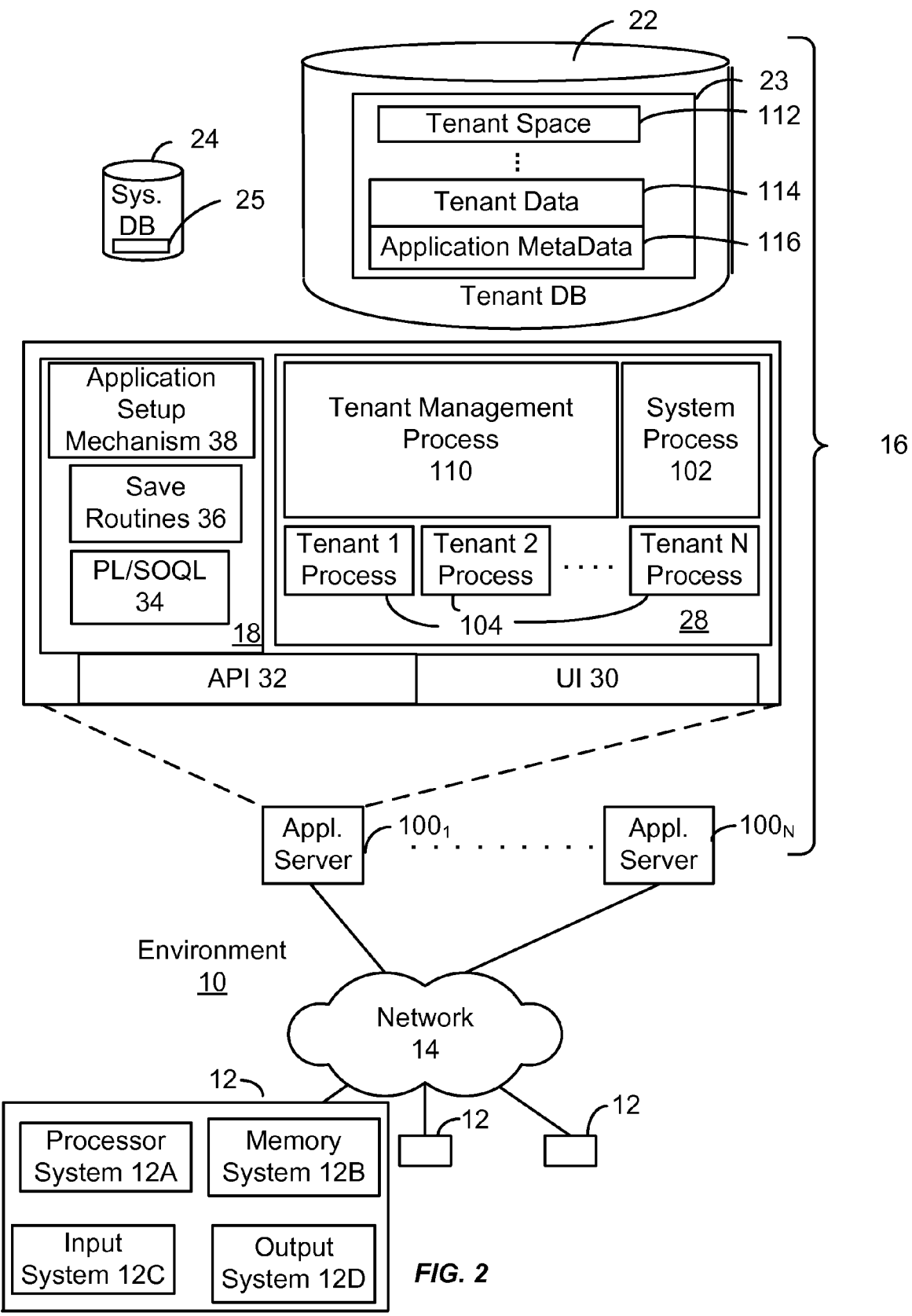
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It may be understood that "table" and "object type" may be used interchangeably herein. Each table generally contains one or more data categories logically arranged as columns or fields in a viewable schema. Each row or record of a table contains an instance of data for each category (type) defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, Opportunity data, and other object types, each containing pre-defined fields. It may be understood that the word "entity" may also be used interchangeably herein with "object" and "table", when entity or object is referring to a collection of objects or entities of a particular type.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

III. Matching and Merging Records

Figure 3:
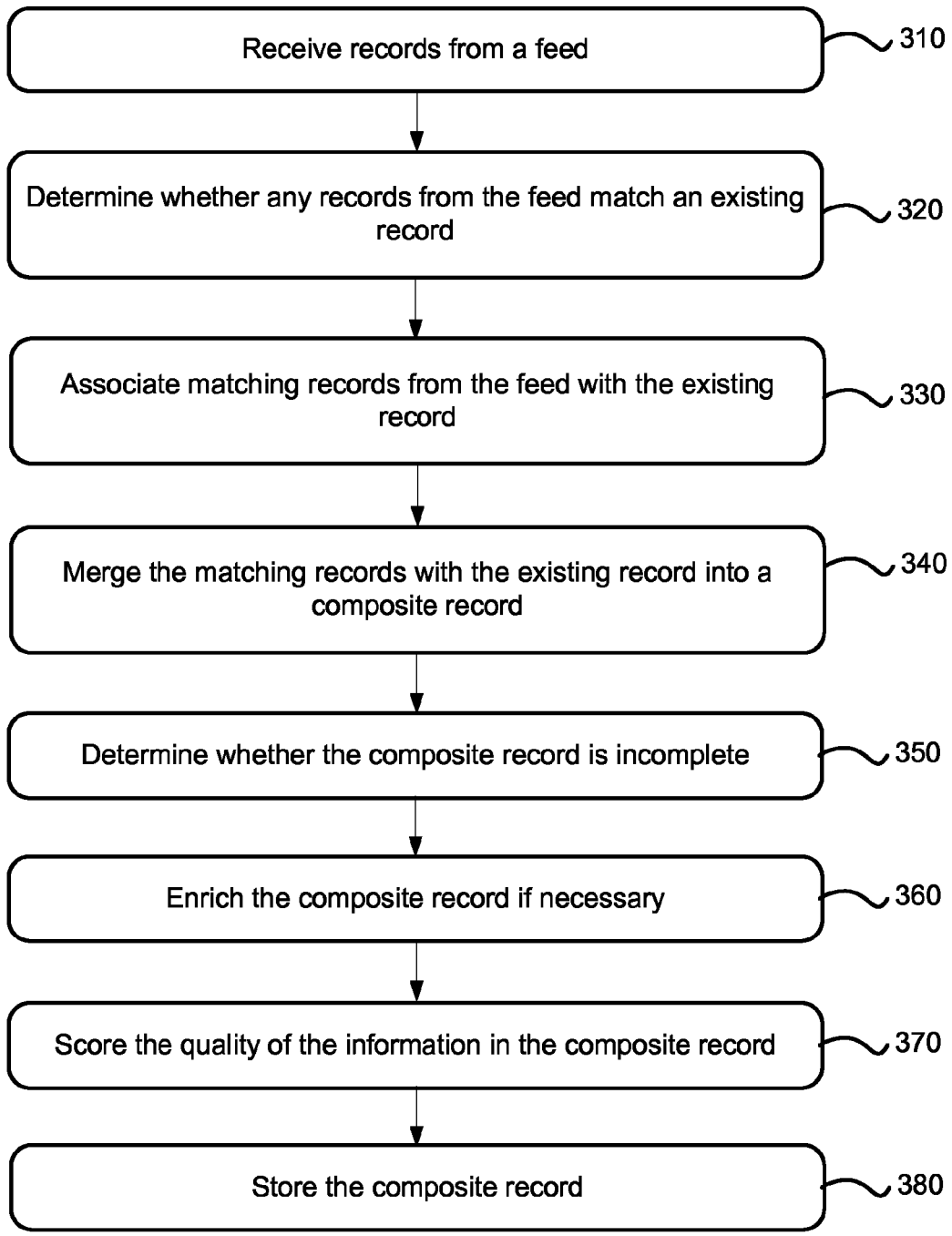
FIG. 3 is a flowchart of a method 300 for matching and merging records.

FIG. 3 illustrates a representative flowchart describing the high-level steps of the method disclosed herein, as implemented in certain embodiments. Records are received (step 310) from a data source, such as a feed, one at a time or in bulk—such records may be either partial or complete. The system determines (step 320) whether any of the records received from the data source match an existing record associated with the same entity (e.g., contact, company). In some embodiments, matching records from the data source are then associated (step 330) with the cluster for the entity. All records associated with the same entity are said to belong to the same cluster. In some embodiments, a cluster may be a set of references (e.g., IDs) to the individual records. The matching records from the data source are then merged (step 340) with the existing record to form a composite merged record; in embodiments implementing clusters, records in the cluster may be merged into the composite merged record. In some embodiments, the composite merged record is analyzed to determine (step 350) whether it is incomplete, and the composite merged record is enriched (step 360) with available information if necessary. In some embodiments, information in the records are analyzed to determine a confidence score indicative of the quality of the information in the records (step 370). Finally, the composite merged record is stored (step 380); in some embodiments, a canonical prototype of each cluster (the group of individual records that comprise a merged record) is maintained, wherein the determination of whether a record and/or cluster is canonical may be based upon a confidence score.

The system scores records in order to capture factors such as contributor credibility, recency of a record from the feed (i.e., age of the data in the record), and possibly some other factors. These scores may influence downstream stages of processing—for example, (i) the confidence score of a merged record may use the quality and recency scores of individual records, and (ii) the process of composing the merged record may also be influenced by the scores of individual records in the cluster (and beyond that, by the specific values in the individual records).

In some embodiments, the system may be able to: maintain all (partial or complete) records in memory; maintain all clusters in memory; maintain certain indices on the records in memory; and/or maintain an ID (or reference) from a record to the cluster it belongs to. (In certain example embodiments, each record belongs to only one cluster.)

In some embodiments, the set of indices maintained within the system may include indices such as: EMAIL INDEX→all records having a certain email; PHONE INDEX→all records having a certain phone; and NAME X COMPANY_SIGNATURE INDEX→all records having a certain NAME X COMPANY_SIGNATURE. For example: (Arun Jagota, jigsaw) may have nameXcompany_signature=ajagota@jigsaw.

In one embodiment, fields of a record may be normalized; for example, for nameXcompany_signature, the name and the company name may be normalized before computing the signature. This accommodates nicknames, e.g., Bob vs. Robert.

System Design

Figure 4:
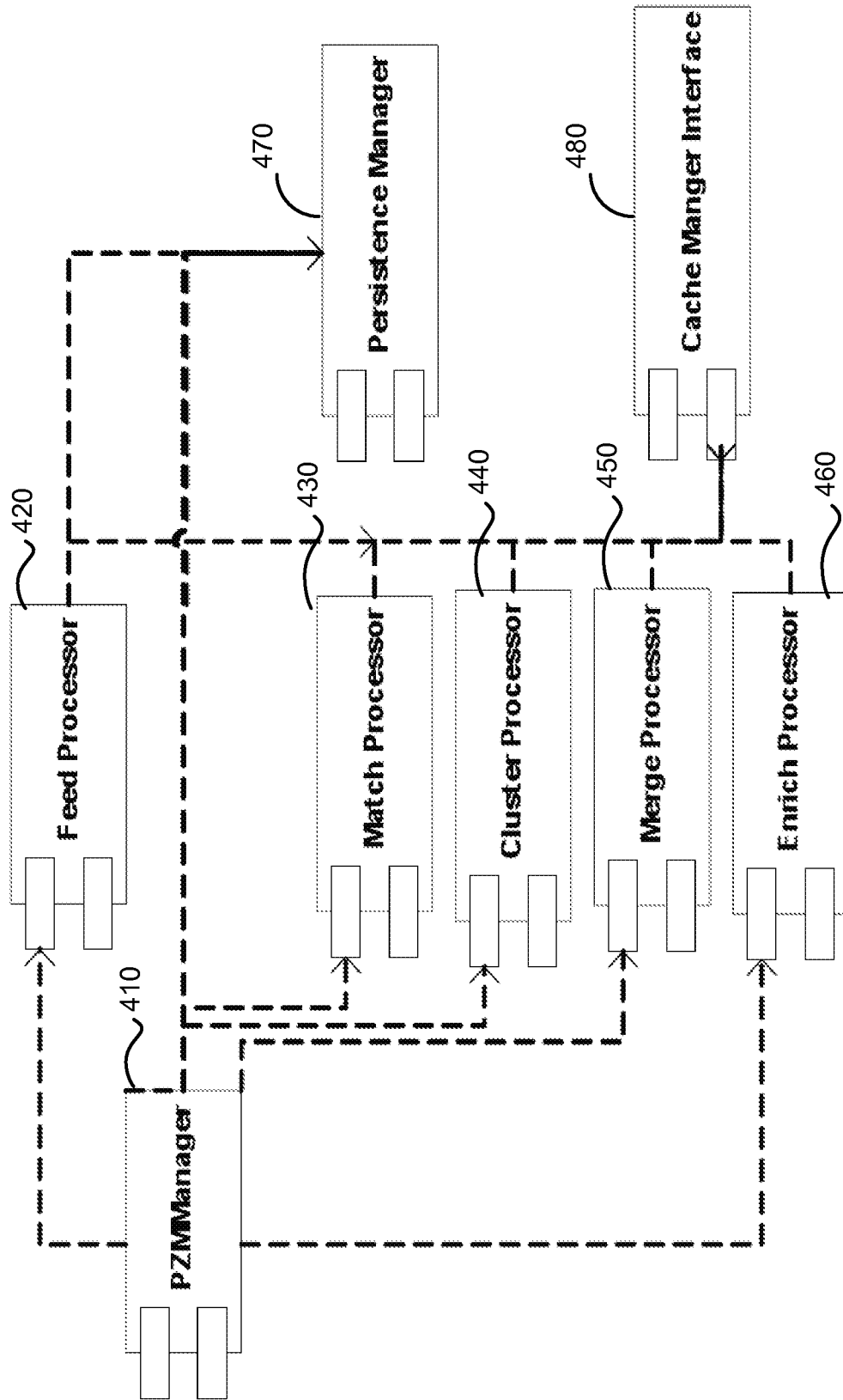
FIG. 4 is a block diagram of a system architecture, according to some example embodiments.

FIG. 4 is a schematic of an example architecture that uses loosely-coupled, independently-running modules to achieve a high degree of configurability with the ability for very transparent monitoring and statistics. The individual modules of the architecture may be as lightweight as possible for maximum runtime performance and optimized for fast throughput. The architecture may be highly process-driven and stateless, with all stateful and persistent artifacts handled by a persistence layer.

PZMManager: In some embodiments, a class PZMManager 410 is provided to manage instances of all classes which extend a base class PZMRunnable. All independently-runnable modules may extend base class PZMRunnable. The purpose of PZMRunnable is to provide common standards of operation and hooks for the PZMManager to start and stop these runnable modules. In some embodiments, PZMManager may support two primary methods, start( ) and stop( ) Calling these methods completely starts or completely stops the PZMManager.

In some embodiments, when the PZMManager comes up, it first runs a cleanup of all "dirty" state that might have been left over from the last time the PZMManager was shut down, including feeds that had been halted mid-processing. The PZMManager then starts up all PZMRunnable modules.

In some embodiments, the thread pool may be managed by Spring, through the use of the ThreadPoolTaskExecutor class.

In some embodiments, the PZMManager is the topmost level of hierarchy in the system. In some embodiments, as described in Table 8 the PZMManager has two methods, start( ) and stop( ) that are exposed to the outside world.

TABLE 8

| Method Name | Action |
| --- | --- |
| start( ) | Starts the PZM and all managed modules. |
| stop( ) | Stops the PZM and all managed modules. |

In some embodiments, a number of configurable parameters (see, for example, Table 9) may be injected via Spring, including the number of each type of PZMRunnable modules that may be set running, and the maximum thread pool size.

TABLE 9

| Spring Param Name | Parameter Effect | Default Value |
| --- | --- | --- |
| poolSize | Number of threads in threadpool | 5 |
| maxNumFeedProcessors | Target number of Feed Processors that may run concurrently | 1 |
| maxNumMatchProcessors | Target number of MatchProcessors that may run concurrently | 1 |
| maxNumClusterProcessors | Target number of ClusterProcessors that may run concurrently | 1 |
| maxNumMergeProcessors | Target number of MergeProcessors that may run concurrently | 1 |
| maxNumEnrichProcessors | Target number of EnrichProcessors that may run concurrently | 1 |
| feedProcessorSleepTime | If no new feeds are found in DB, retry interval | 2000 ms |

PZM Runnables:

Each of the following components represented in FIG. 4 may extend the PZM Runnables class: Feed Processor 420, Match Processor 430, Cluster Processor 440, Merge Processor 450, Enrich Processor 460, Persistence Manager 470, and Cache Manager Interface 480. (Their descriptions are listed in their respective sections below.) All PZM Runnables may implement the Java Runnable interface. They may therefore be started by calling run( ). They each also may depend upon the caching layer.

Each of the PZM Runnables may share similar Lifecycle, Interface, Dependencies, Local data, and Performance characteristics.

Lifecycle description: Each component may be created by the PZM Manager. The modules may be instantiated once, the quantities of which are determined by dependency injection on the PZM Manager. The PZM Manager then may set the modules to run. Each module may have its own runtime profile. In some cases, a module may poll for a condition (Feed Processor 420 polls the DB for feeds at an externally configurable rate), or they operate on in-memory semaphores (PZM processors are triggered on an in-memory queue structure). When the PZM is stopped, the PZM Manager may signal all PZMRunnable threads to gracefully die after completion of their current cycle of execution.

Interface description: All PZMRunnable modules may implement the Runnable Interface which is how they are executed. They may be executed by the Spring ThreadPool-TaskExecutor. Each PZMRunnable module may expose hooks that allow the PZM Manager to start or stop them.

Dependencies: Each module may have a dependency on the caching layer. The specific dependencies upon the caching layer are defined for each component below.

Local data: Some local state is maintained, primarily the in-memory queues that represent the records in their intermediate state of processing.

Performance issues: All modules may be designed as lightweight as possible for optimal runtime throughput performance. Data structures to be persisted lean towards using primitives and simple Java types (like HashMap) instead of DTOs and wrapper classes to speed construction, parsing, and serialization, and cut down on storage costs. Modules are designed to be independently runnable and self-maintaining, requiring minimal intervention code. Statistics and monitoring are implemented as cross-cutting logic, employing external agents to which metrics can be persisted and are swappable with heavier or lighter implementations when appropriate.

Feed Processor

The purpose of Feed Processor 420 of FIG. 4 is to process each row of data in a feed and parse it into a Record object to facilitate matching, clustering, merging and eventual canonicalization of Contact and Company records. Each Record object may be a simple value object and may contain a Hashmap that contains key value pairs like first name, last name, phone, email address. See below for additional details on the Record object. All or some keys may be populated based on the data that is available in the row. Some Keys may also contain multiple values such as Address or Phone numbers.

Feed Processor 420 retrieves feeds from the UPLOADED_FEED table, and retrieves them one feed at a time, such that one or many feeds are retrieved at a time. The feeds may each be marked as "in process", and then Feed Processor 420 parses each row in the uploaded file in succession. When the parsing of the whole row is complete, the corresponding Record object may be written out to an in-memory queue to be picked up by the corresponding Match Processor 430.

The queue may be an implementation of java.util.Queue, and for thread safety and synchronization issues, the implementation may be BlockingQueue, from the java.util.concurrent package. As the Match Processors are each ready to process their respective records, each processor may independently dequeue a single one of their respective records from the queue, and processing begins. The use of BlockingQueue automatically places internal locks around all enqueue and dequeue methods. Furthermore, BlockingQueue automatically causes wait( ) to be called in the current thread when there are no objects in the queue. This means that Match Processor 430 simply waits on the queue, and begins running again when a new record enters the queue, or terminates if the PZM is terminated.

Match Processor

Match Processor 430 of FIG. 4 matches Records that come from a feed to Records that already exist in the cache. For each record in the feed, in an example embodiment, it does the following. It takes the record, puts it in the cache, and runs FindMatchingRecords on the (cached version) of this raw record to find zero or more records in the cache that match it 'sufficiently well'. FindMatchingRecords, as described below, uses various normalizers and lookups of indices in a particular order to find the matching records. The resulting set (possibly empty) of these matched records, along with the feed record, is sent to another in-memory queue that is picked up by Cluster Processor 440.

Every index may have an IndexManager which supports at least the following methods:

- indexManager.normalize(r, field_normalizations)—returns an ordered list, possibly empty, of normalized strings. Here r is the input record, and field_normalizations is a hash of precomputed normalized lists for select fields (this is done because index normalizers are composed from field normalizers—see below). Although some normalizers, e.g., email normalizer, need only the email, because one may want to keep a uniform interface for all normalizers, and because some normalizers need multiple fields, the input to normalize is a record, not a field value.
- indexManager.lookup(key)—does what it says
- indexManager.fields—returns the fields that this index is composed of (This method may be used in the matcher.)

Normalizers

In example embodiments, there are field normalizers, from which are composed index normalizers. Each normalizer—field or index—returns an ordered list of keys. All field normalizers may take r as an argument for uniformity of interface, and to allow for a normalizer to use the data in multiple fields of a record, e.g., normalize_name(r,mode), normalize_phone(r), normalize_email(r), normalize_company_name(r). All accents, if any, from characters in the record r will be removed before further normalization. Presented below are examples of normalization:

| | Field = Name | |
|---|---|---|
| Relevant values in r | [Normalized List] | Comments |
| John Doe | [jdoe] | flast |
| Bob Doe | [rdoe] | Alias Bob -> Robert is used |
| Harry Potter, Jr. | [hpoter] | Suffix "Jr." is dropped; consecutive consonants dropped |

-continued

| | | |
|---|---|---|
| Dr. John Doe | [jdoe] | Prefix, "Dr." dropped. |
| John Do-Dah | [jdodah] | // Drop hyphen |
| John O'reilly | [joreily] | // Accent normalization, here "'" is dropped. Also "ll" => "l". |

| Field = Email | |
|---|---|
| jdoe@us.ibm.com | [jdoe@us.ibm.com,jdoe@ibm.com] |
| info@ibm.com | [ ]    // Not a person email |

| Field = company | |
|---|---|
| Intel Corporation | [intel] generic suffix dropped |
| Oakridge National Laboratory | [oakridge national laboratory,oakridge national,oakridge] |
| Hewlett-Packard => [hewletpackard] | // Drop "-", replace "tt" => "t". |
| National Institutes of Health [nih] | Knowledge-free acronymization after stop-word removal, i.e., "of" |

Every field normalizer may return [ ] when r.f is nil, and where f is the field of the normalizer. The bodies below supplement the examples in the previous section.

```
normalize_email(r)
   ...
   return [ ] unless r.email is a person email (e.g., info@ibm.com is not a person email)
   // To test whether an email is a person email, the head of r.email (in above example info)
   has to be fuzzily matched against r.first_name and r.last_name.
   ...
End
normalize_phone(r)
   ...
   p = r.phone
   If p is detected to be a US phone
      p.insert_at(0,'1') if p[0] != '1'
   end
   // Below is for both US or international
   base,extension = p.split(/x|ext|.../)
   base.drop_all_non_digits!
   if extension
      extension.drop_all_non_digits!
      Return [base+ 'x'+extension,base,first_6_digits(base)+'x'+extension,
first_6_digits(base)]
   Else
      Return [base,first_6_digits(base)]
   end
End
Additional notes for normalize_phone
if token =~ /^(\+?1[\s\.-])?(\d{3})[\s\.-](\d{3})[\s\.-](\d{4})$/
   standardized = "1.#{$1}.#{$2}.#{$3}"
def FieldParsers.is_US_phone?(token)
   return false unless token
   n_token = token.sub(/\?$/,'')
   n_tokens = n_token.strip.split(/(x|ext\.?|#)/)
   # If there is an extension, ignore it and apply the test to the base of the phone
   return false unless n_tokens[0]
   return true if n_tokens[0].strip =~ /^(\+?1[\s\.-])?\d{3}[\s\.-]\d{3}[\s\.-]\d{4}$/
# E.g., +1-888-278-5515, +1.888.278.5515
   return true if n_tokens[0].strip =~ /^(\+?1)?\s*\(\d{3}\)\s*\d{3}[\s\.-]\d{4}$/
# E.g., +1 (702) 413-4278
   return true if n_tokens[0].strip =~ /^(\+?1[\s\.-])?\d{10}/
# E.g., 8889994345
   return false
end
```

Generally, it may be useful to compute field normalizations before index normalizations so that the former may be reused. The notation below makes this explicit. normalized_fs denotes the list of keys obtained from having run normalize_f on r.

```
Email_index_manager.normalize(r,normalizations_by_field)
    return normalizations_by_field[:email]
Manufactered_email_index_manager.normalize(r, normalizations_by_field)
    <Body described later>
name@company_index_manager.normalize(r, normalizations_by_field)
    return normalizations_by_field[:name] X normalizations_by_field[:company] as
ordered list.
    // The ordering criteria is length of n-c key, where n in normalized names, c in
normalized_companies
corporate_phone_idx_manager.normalize(r, normalizations_by_field)
    return normalizations_by_field[:phone]
Manufactered_email_index_manager.normalize(r, normalizations_by_field)
    return [ ] unless r.email
    return compute_manufactured_emails(normalizations_by_field[:name],r.email)
end
compute_manufactured_emails(normalized_names,email)
    D = get_domains(email) // E.g: D = {"us.ibm.com", "ibm.com"} for
jdoe@us.ibm.com
    return normalized_names X D.
End
Stock_ticker_index_manager.normalize(r,normalizations_by_field)
    n = [ ]
    n << r.company if r.company // ticker could be in company field
    n << r.ticker if r.ticker and !n[r.ticker]
    return n
end
```

Matchers

```
Ignore
// If the two records have the same phone and that phone is not a corporate
phone and the phone-uniqueness-score is high, this is likely to be a true
positive even if only a few other fields match.
// Note that phone-uniqueness-score is easy to compute from the DIRECT-
DIAL-PHONE-INDEX
```

-continued

```
This is a simplified and approximately functionally equivalent version of
the description in section Match Processor
EndIgnore
```

The two implementations below, FindMatchingRecords( . . . ) and is_true_positive( . . . ) are bimorphic, shared by contact and company matchers respectively. In this example, let r denote the raw record (cache version).

```
FindMatchingRecords(r, index_managers_ordered, fields_to_normalize,
mismatch_indicator_fields_ordered, match_tester_fields_ordered,
field_to_match_indicator_set_id, match_indicator_sets_target_counts)
        // First, get normalizations of all key fields
        normalizations_by_field = { }
        fields_to_normalize.each { |f|
            normalizations_by_field[f] = normalize_#{f}(r)
        }
        Index_managers_ordered.each { |index_manager|
            normalized_keys_in_order = index_manager.normalize(r,
            normalizations_by_field)
            normalized_keys_in_order.each { |nk|
                M = index_manager.lookup(nk)
                M = M.select { |m|
                    is_true_positive(
                        m,
                        r,
                        mismatch_indicator_fields_ordered,
                        field_to_match_indicator_set_id,
                        match_tester_fields_ordered,
                        match_indicator_sets_target_counts,
                        index_manager.fields)
                }
                return M unless M is empty
            }
        }
        Return { }    // If you reach this point, there is no cache record matching r
End FindMatchingRecords
boolean is_true_positive(r1, r2, mismatch_indicator_fields_ordered,
```

-continued

```
match_tester_fields_ordered, field_to_match_indicator_set_ids,
match_indicator_sets_target_counts, index_matched_fields)
    score = { }
    // Check for quick rejection based on detected mismatch on any one of certain
fields
    mismatch_indicator_fields_ordered.each { |f|
        next unless r1.f and r2.f //If for a field f, there is no value in the field(null/empty),
continue processing.
        // Exs: f = phone.direct, f.base = phone, f.extension = direct
        // f = phone, f.base = phone, f.extension = nil
        score[f] = f.base.score_fuzzy_match(r1.f,r2.f,f.extension)
        return false unless score[f] >= f.FUZZY_MISMATCH_THRESH // f =>
f.base?
    }
    // Pair survived quick rejection
    // check for match based on minimally sufficient positive tests
    match_indicator_sets_actual_counts =
Array.new(match_indicator_sets_target_counts.length,0)
    index_matched_fields.each { |f|
        score[f] = 1
    }
    match_tester_fields_ordered.each { |f|
        next unless r1.f and r2.f //If for a field f, there is no value in the field(null/empty),
continue processing.
        score[f] = f.base.score_fuzzy_match(r1.f,r2.f,f.extension) unless score[f]
        if score[f] >= f.FUZZY_MATCH_THRESH
            field_to_match_indicator_set_ids[f].each { |set_id|
                match_indicator_sets_actual_counts[set_id]++
                return true if match_indicator_sets_actual_counts[set_id]
== match_indicator_sets_target_counts[set_id]
            }
        end
    }
    // ; do full scoring
    scorable_fields.each { |f|
        next unless score[f]
        next unless r1.f and r2.f
        score[f] = f.score_fuzzy_match(r1.f,r2.f)
    }
    // Compute overall non-normalized score and decide.
    // For below, note that nil.to_f is 0.
    // Notes: make field_weights a parameter to this method. The reason field_weights is a
hash
    // and not f.field_weight because the weight depends not only on the field but also on
    // match_type (company or contact)
    overall_score = sum_{f}(step(f,(score[f].to_f))*field_weights[f])
    // Make overall_score_cutoff a parameter to this method. In the case of contact
    // match, and when required, overall_score_cutoff could be made to depend on
    // r2.company.size. This would be a JDF use case.
    return (overall_score >= overall_score_cutoff)
    return false // default
END is_true_positive
invert(match_indicator_sets_ordered)
    field_to_match_indicator_set_id = Hash.new([ ])
    match_indicator_sets_ordered.each_index { |i|
        match_indicator_set = match_indicator_sets_ordered [i]
        match_indicator_set.each { |f|
            field_to_match_indicator_set_id[f] << i
        }
    }
    return field_to_match_indicator_set_id
end
```

Contact Matcher

| Contact Matcher |
|---|
| Index_managers_ordered_for_contact_matching = [EMAIL_IDX, MANUFACTURED_EMAIL_IDX, NAME@COMPANY_IDX, DIRECT_PHONE_IDX, NAME@DIRECT_PHONE_IDX, NAME@CORPORATE_PHONE_IDX,...] <br> fields_to_normalize_for_contact_matching = [:name,:email,:phone,:company] <br> mismatch_indicator_fields_ordered_for_contact_matching = [first_name,last_name] <br> //TO DO - Create a class for managing hits to match_indicator_sets - e.g., create an inverted index |

Contact Matcher

```
// Using this class in FindMatchingRecords and is_true_positive will simplify the code
// Alternately, go back to using the old, slightly inefficient but transparent, match_indicator_sets
logic.
match_indicator_sets_ordered_for_contact_matching = [
  [email],
  [first_name,last_name,domain,title], // domain = domain_of(email)
  [first_name,last_name,phone.direct],
  [first_name,last_name,company,title]
  ...
]
```

[email] as a match_indicator_set works well as illustrated below. If an external record contains an email that matches a cache record, the match is deemed a true positive unless the external record has a person name and the cache record has a person name and both are different. This makes sense—an email match is considered a true positive unless there is evidence to the contrary.

```
match_tester_fields_ordered_for_contact_matching =
[email,first_name,last_name,title,company,domain,phone]
match_indicator_sets_target_counts_for_contact_matching =
match_indicator_sets_ordered_for_contact_matching.map
{ |e| e.length }
field_to_match_indicator_set_id_for_contact_matching =
   invert(match_indicator_sets_ordered_for_contact_matching)
FindContactMatchingRecords(r)
     Return FindMatchingRecords(r,
        index_managers_ordered_for_contact_matching,
        mismatch_indicator_fields_ordered_for_contact_matching,
        match_tester_fields_ordered_for_contact_matching,
        field_to_match_indicator_set_ids_for_contact_matching,
        match_indicator_sets_target_counts_for_contact_matching
        )
end
```

Company Matcher

```
Index_managers_ordered_for_company_matching =
[DOMAIN_IDX,CORPORATE_PHONE_IDX,
COMPANY_PREFIX_IDX,STOCK_TICKER_IDX]
// :domain below is r.website; :phone is r.corporate_phone
fields_to_normalize_for_company_matching =
[:domain,:phone,:company]
mismatch_indicator_fields_ordered_for_company_matching =
[company,domain]
// The nesting below is OR-AND, extendible to OR-AND-OR.
// NOTE: If the extension, e.g., the OR in OR-AND-OR is needed, also
modify the method is_true_positive to accommodate it.
match_indicator_sets_ordered_for_company_matching = [
    [domain],
    [company],
    ...
]
field_to_match_indicator_set_id_for_company_matching =
    invert(match_indicator_sets_ordered_for_company_matching)
FindCompanyMatchingRecords(r)
    Return FindMatchingRecords(r,
        index_managers_ordered_for_company_matching,
        mismatch_indicator_fields_ordered_for_company_matching,
        match_indicator_sets_ordered_for_company_matching)
end
```

Hybrid Matcher

The hybrid matcher matches an external contact record to cached company records (which may be Jigsaw company records in the case of JDF). One use case that motivates this is the following. Let r denote an external contact record with r.first_name, r.last_name, r.company having values and the rest missing. If a hybrid match matches r to a company record c (in this example presumably r.company matches c.company), then the phone and address in c can be used to fill in missing phone and address in r. A further refinement of this is illustrated by the following use case. Let r have r.first_name, r.last_name, r.company, r.phone. Let c denote a company record matched by the hybrid matcher to r. c may have multiple addresses. To fill in r.address one may use that address from c that matches r.phone best.

A different use case of the hybrid matcher—to company puzzlemaster—is presented in Section Use Cases.

Field Matchers

```
float first_name.score_fuzzy_match(f1,f2,e)
     // f1 and f2 are first_names of r1 and r2 respectively
     // f1 and f2 are assumed in lower case
     return 1 if f1 == f2
     return 1 if is_first_name_synonym(f1,f2) // E.g., (Bob,Robert).
     Use the first_name synonyms alias list for this
     return 0 if is_first_name_distinct(f1,f2) // E.g., (eric,Erica) See
     Note A below for explanation
     // Now check for prefix match. See Note B for an explanation.
     return first_name.FUZZY_MATCH_THRESH if f1 is
     a prefix of f2 or f2 is a prefix of f1
     // For below, let f1' be the shorter of f1 and f2, and f2' the other
     return FuzzyMatcher.score(f1',f2') // See Note C below
end first_name.score_fuzzy_match
float last_name.score_fuzzy_match(l1,l2,e)
     // l1 and l2 are last_names of r1 and r2 respectively
     // l1 and l2 are assumed in lower case
     return 1 if f1 == f2
     return FuzzyMatcher.score(f1',f2') // See Note C below
end last_name.score_fuzzy_match
float company.score_fuzzy_match(c1,c2,e)
     // c1 and c2 are company names of r1 and r2 respectively,
and assumed to be in lower-case
end
```

A dynamic programming algorithm (of which Levenshtein distance is a special case) is designed and tested specifically for company fuzzy matching. It is in ruby in CompanyName-FuzzyMatcher.rb. This document contains results of some tests on real data representing company names in matched pairs (both true and false) of records. These tests also illustrate its capabilities.

Examples Covered by A

| | |
|---|---|
| FOUNTAIN PLATING COMPANY INC | Fountain Plating |
| COLONIAL PARK UNITED METHODIST CHURCH | Colonial Park United Methodist |

```
float title.score_fuzzy_match(t1,t2,e)
    // TO REFINE
    return (# words in t1 and t2) / (# words in t1 or t2)
end
```

Note A: is_first_name_distinct is primarily used for first names which are lexically similar, e.g., (Patrick,patricia), (eric,Erica) so that the edit-distance based fuzzy matcher would return a high score but are in fact distinct first names because their gender is different.

Note B: The approach taken above is to use an alias list of non-prefix aliases, e.g., (Bob,Robert) and to rely on a knowledge-free way of scoring prefix aliases (e.g., ed, eddy). This does not require maintaining an ever-growing list of prefix aliases.

Note C: There may be two implementations—one in Ruby and one in Java—which may be equivalent. One may be used.

Cluster Processor

Cluster Processor 440 of FIG. 4 associates records from the feed with the cluster associated with the existing record that matches the records from the feed.

```
ClusterProcessor(M,r) // M is set of matching records from
MatchProcessor
    c* = FIndBestCluster(M,r) // FindBestCluster returns nil if M is empty
    if !c*
            c = new cluster
            Insert(r,c)
    Else
            Insert(r,c)
Insert(r,c)   // This step has the following sub-steps
    r.cluster_id = c
    Add r.rid to the set c.record_ids
    Update c.score
    c.last_modify_time = now
    Insert c into MergeProcessor to-process queue
FindBestCluster(M,r)
// The algorithm below relies on the fact that MatchProcessor prunes
false positives.
    Return { } if M is empty
    Let n_c = |{ m in M | m.cluster_id == c}|
    Let c* = max_c(n_c)
    Return c*
    // E.g., above returns cluster_id that appears most frequently in M.
End FindBestCluster(M,r)
```

Consider the following hypothetical case. Let R denote the set of records in the cache. Let C subset R denote a certain true cluster. Imagine that for some reason the above clustering algorithm (think of it as operating on records in R arriving sequentially) is able to cluster the records in C only into C1, . . . , Cm. So C1 U C2 U . . . U Cm=C. If the false positive check is accurate (has high precision and high recall) this is likely to happen only if the records don't have enough information in them to reconstruct C. Now imagine that a new record r arrives and whose arrival is able to connect the dots, e.g., merge C1, . . . Cm into C.

If the above mentioned case is expected to occur at least some of the time in practice, the following modification to FindBestCluster(M,r) is worth considering.

Let C1, . . . , Cm, m>1 denote the clusters

Merge Processor

The Merge Processor 450 of FIG. 4 picks up the cluster record from the queue and merges the records (partial and/or complete) in the cluster into a single composite record (the merged record) and computes a confidence score for the merged record. If the merged record is incomplete, it enriches it (when possible) with information available in the cache. (Details of this are below.) If the record is complete, it is marked as canonicalized. At this point, the record is ready to be persisted in the database, provided its confidence score is sufficiently high. The merge processor also may update the merge time of the cluster record.

A confidence score may be calculated for a record from the feed. The overall confidence score for the merged composite record may be based upon one or more confidence scores that are calculated for features of the record. The overall confidence score for the merged composite record may be used to determine whether it should be canonicalized.

In one example, r denotes a contact record received from the feed. A number of features (e.g., components in Ruby) may be defined, and each feature may be scored. In the notation below, score(r, f) is the score for a record r with respect to feature f. There are single field features and multiple field features. The current set of features may include features such as recency, title rank, title quality, domain-specific email pattern, domain-independent email pattern, phone number quality, first name quality, last name quality, or area code/state consistency.

The overall score of a record is $$score(r)=sum\_\{over\ features\ f\}weight(f)*score(r,f)$$

Let us now describe the feature scores. Some descriptions are qualitative. For quantitative details, see the reference implementation (MergeContacts.rb), some of which will change in any case.

score(r,recency)—may exponentially decay in weight as a function of (today-r.day), where r.day is the date when the record was added. If r.day is today, then this score has value 1; it goes to 0 over a designated period of time.

score(r,rank)—based on the rank of r.title. C-level titles (e.g., CEO, COO, CTO, CFO) get a score of 1; this score may monotonically decay for lower ranking titles. Consider the titles CMO (Chief Marketing Officer) and CEO (Chief Executive Officer). Currently, both get the same score because they have the same rank (C-level), same length, and same title quality. If a cluster contains both titles, one may want to pick the CEO one. To make this happen, this score may be adjusted for finer differences, e.g., scoring CEO higher than CMO.

score(r,title_quality)—high ranking titles, e.g., Vice President, do not necessarily have high quality. Title quality scores this separate dimension. A title is deemed to have high quality if it has a known rank (note that the rank classifier can return OTHER, which is not a known rank), has a known department, and is not in an explicit list of poor titles. The quality decreases depending on which (and how many) of the tests in the above sentence are violated.

score(r,domain)—this is only defined when the domain-specific email pattern is known, i.e., r's company has been matched to company jc.

score(r,d)=#emails in domain d/#contacts in company jc score(r,pattern_domain)—the domain-independent email pattern—how well (r.first_name, r.last_name, r.email) fits the email pattern of the domain of r.email. In some embodiments, the system may set this score to zero if the email domain is a banned domain or if the email header is generic.

---

Let p(r) = (r.first_name,r.last_name,r.email) be the pattern in r.
p = first.last for (john,doe,john.doe@xyz.com)
p = flast for (john doe,jdoe@xyz.com)
score(r,pattern_domain) = #emails in domain of r.email having pattern p(r), divided by, #emails in domain of r.email

---

As described to this point, score(r,domain) and score(r, pattern_domain) contribute additively to the overall score. One possible consequence of this is illustrated by the example below. nick.saylor@citizensbank.com may score highly for a person "Thomas McKinlay" if the domain citizensbank.com has a lot of emails. This is because even though score(r, pattern_domain) is 0, since nick.saylor does not match the pattern tmckinlay of Thomas McKinlay, score(r,domain) is high. This problem is solved by using these two score components multiplicatively, i.e., as weight*score(r,pattern_domain)*score(r,domain).

score(r,phone_number_quality)—How likely the phone number is to be a direct connection to the contact, e.g., direct phone number versus a general corporate number versus a corporate number containing an extension.

score(r,first_name_quality)—How likely the string is to be a first name. "John" would get a very high score and "asdasd" a very low score. score(r,last_name_quality) is similar. The algorithm used is a tri-grams Markov Model trained on all first and last names in the database.

In some embodiments, a person name commonality score may be provided. "John Smith" would have a much higher commonality score (it is a common name) than Kirc Ruchenski. When available, company size (number of contacts) may also be used in matching contacts.

Person name commonality is computed from the person names in the contacts database (currently containing 25 million contacts). If there is a person name match in a very small company, then title differences (even if large) are ignored, because the same person may play multiple roles in a very small company. If there is a person name match in a somewhat small company, and the person name is uncommon, then the match may be accepted as well.

Merge Algorithm

In the description below, it is convenient to think of scores[r][f] as score(r,f). Also for convenience, let scores[r][overall]=score(r) as defined above.

---

Merge(c)
1. scores = c.map { |r| compute_scores(r) } // record ALL scores over all records in c
2. Find record r* in c having highest score scores[r,overall] // record-level merge
3. Update values of fields in r* so long as score( r*) keeps increasing // field-level updates. This will use scores for efficiency
end Merge

---

Potential rationales for doing record-level merge followed by field-level updates are:

i). In most cases, the winning version in record-level merge may be near complete.

ii). There may be an implicit 'coherence' scoring expressing that field values in any single record are more likely to be consistent with each other than field values arbitrarily assembled together from multiple records.

Note that for (i), it is desired that score[r][overall] be unnormalized, which is the case from Eqn (1) above. Unnormalized scores favor records with more fields having values than fewer, which may be helpful.

If scoring was perfect, then (ii), e.g., assembly of field values from different records to form a record with highest score would be the right thing to do. However, the scoring is not perfect (and will never be) so 'implicit coherence scoring' reflected in doing record-level merge first is a good strategy.

In some embodiments, additional meta-data may be incorporated into Contact record objects. For example, a field status_id could be utilized to determine whether a record is bogus or not.

--- score_bogus = (version["status_id"] == 2) ? 0.0 : 1.0
score[:record_level] = version['confidence_score'] ?
version['confidence_score'].to_i/100.0 : 1
score[:record_level] *= recency_multiplier
score[:overall] = cumulative_score*score[:record_level]*score_bogus

---

Sometimes a user may update the value of a record. For example, a member may change the phone (previously p) to a new one q. One cannot say for sure that the old value (in this example p) was bad. However, as a heuristic, it makes sense to infer that statistically speaking (i.e., occasional exceptions aside) a value that was changed was relatively poor. In this example, all other things being equal, q may score higher than p. As the following example illustrates, the record-level recency score by itself will not adequately produce the behavior. Suppose a contact has two versions, the older one containing the phone p and the newer one containing the phone q. Suppose a third version arrives, and it contains the phone p. p in the new version may score lower than q.

In another example, a field dead could be utilized to track whether a particular aspect of a Contact record is no longer valid, e.g., email address, email domain, phone number.

--- dead_emails = Set.new
records.each { |r|
        if (r is a jigsaw record and
                r.dead is one of DEAD_EMAIL,
                DEAD_PHONE_AND_EMAIL[1])
            dead_emails.add(r.email)
    end
}
dead_domains = Set.new
records.each { |r|
        if (r is a jigsaw record and r.dead equals
                DEAD_DOMAIN_SMTP_INVALID[2])
            dead_domains.add(domain_of(r.email))
    end
}
dead_phones = Set.new
records.each { |r|
        if (r is a jigsaw record and
                r.dead is one of DEAD_PHONE,
                DEAD_PHONE_AND_EMAIL)
            dead_phones.add(r.phone)
    end
}

[1]These are among the values of the field dead in the table contact_version
[2]These are among the values of the field dead in the table contact_version In some cases, if a cluster contains a record whose email (phone) is known to be dead, and a new record with an email (phone) that is not dead comes into this cluster, the new email (phone) is used and a new merged record created.

If the cluster contains at least one contact_version record, the merged record's master_id may be set to the contact_id of one of these records. (If the cluster contains multiple contact_ids, break ties arbitrarily for now.)

Merge Enhancements

In some embodiments, feeds are purged by a routine (also called a reaper) that can remove items deemed not worthy to keep (e.g., old items). Any underlying data structures from which feed items are created can also be purged. In one embodiment, the reaper can remove certain items when new items are added (e.g., after every 5$^{th}$ item added). As another example, feed items may be deleted synchronously during the save operation itself. However, this may slow down each save operation. In one embodiment, however, this may be better than incurring a larger cost when the items are removed at longer intervals. In another embodiment, the reaper can run periodically as a batch process. Such routines can ensure that a table size does not become too large. In one aspect, a reaper routine can keep the event history table relatively small so the sharing checks are not extremely expensive.

In various embodiments, the reaper can maintain a minimum number (e.g., 50 or 100) of feed items per record, maintain a minimum number of records per user (e.g., per user ID), and not deleting feed items (or entire records) which have comments against it. Such embodiments can ensure that the detail page and profile page have sufficient data to display in a feed. Note that the sharing checks for feed queries can cut down the number of records further for users with less access. Thus, the number of records finally displayed for specific users can be significantly less than a minimum number for a specific profile or record feed. In one embodiment, a reaper deletes data that is older than a specified time (e.g., 6 months or a year).

In one embodiment, the reaper can perform the deletion of feed items (purging) as a batch up deletion. This can avoid deletion of large number of records that may lead to locking issues. In another embodiment, the reaper can be run often so that the table does not become difficult to manage (e.g., size-wise). In this way the reaper can work on a limited set of records. In one implementation, the reaper may have logic that deletes certain items (e.g., by an identification) from tables, or sections of the tables.

Facts in a reaper's repository may also be available to the merge algorithm. For example, confirmation and bounce reports about emails can be used by merge to decide which email to select in the merged record. The same may be true for phone verification facts.

The PZM Statistics Module may be accessible from all PZMRunnables, and may allow each module to record all important statistics that quantify the efficacy and performance of that module. Its interface may be well defined, but the concrete implementation can take any form, persisting to DB, outputting to JMS, or any other medium Enrich Processor The Enrich Processor 460 of FIG. 4 enriches merged records that are found to be incomplete with available information, e.g., from the cache.

```
Merge_and_Enrich(c) // c is a cluster
    r = Merge(c)
```

```
    if r is incomplete
        r = enrich(r)
end Merge_and_Enrich
Enrich(r)
    // Fill in corporate phone and address if possible
    if (!r.phone or !r.addess)
        // Find r's company in database
        if r.email or r.website
            d = get_domain(r.email or r.website)
            jc = DOMAIN_IDX.lookup(normalize_domain(d))
        elseif r.company
            jc = FindCompany(r)
            // FindCompany does a fuzzy match
            //Lookup company thru company name index
            and on the match,
        run CompanyNameMatcher
        End
        unless jc
            // company of r found
            r.phone,r.address =
            [jc.corporate_address,jc.corporate_phone]
        end
        // Instead of always picking jc HQ phone and address,
        one could pick
        // (when appropriate) a jc location that is more local.
        For example, if r.city
        // is known but r's street address is not known,
        one could pick a jc
        // location in r's city if it exists.
    End
        // If r.email is missing and r.company is known,
        one could guess it from
        // (r.first_name,r.last_name,domain) where domain
        is dominant domain of
        // company (jc) match to r.company. Use
        jc = FindCompany(r) to find jc
end Enrich
```

Persistence Manager

The Persistence Manager 470 of FIG. 4 is responsible for persisting all the data that passes through PuzzleMaster to persistent (as opposed to transient) storage. This includes input data (feed records), intermediate data (e.g., which records are in which cluster), and final data (the final merged record).

Cache Manager Interface

The system may keep all data needed for matching, clustering, and merging in a cache for performance (speed) reasons. A cache is basically distributed memory. The Cache Manager Interface 480 of FIG. 4 provides mechanisms to add data to this cache, or look it up in various ways.

Use-Cases, Applications, Generalizations

The above framework will easily accommodate a company puzzlemaster, e.g., matching, clustering, merging, and enrichment of company partial and complete records to form complete and canonicalized company records. A lot of company records coming in from crawled (and other) sources have a missing website. Often they also have a missing phone. Both phone and website may be required for a company record to be in persisted in the database. There are at least three ways to alleviate the problem, and all may fit into the proposed system.

When a website is missing, guess it from the company name (when possible). In the system framework, this would fall into enrichment.

When a website (phone) is missing in a company record, and a contact record with an email (phone) comes in for the company of the missing website, take the domain of the email (phone) and make it the company website (phone). This involves a hybrid matching (matching of the contact (partial or incomplete) record to find the company record, probably by (fuzzy) company name matching. The combination of one or more contact records with one or more company records of the company of the contact can be seen as a hybrid cluster. The filling in of website and/or phone in the company record can be seen as a hybrid merge.

The third way is to simply rely on matching and clustering of company records themselves to increase the chance of getting complete data. For example, it is conceivable that one could easily build a crawler/parser framework that simply goes out and fetches as many pairs of (company-name, website) as it can. These can be fed to the system, whose matching+clustering can then cluster these records with other company records and eventually form complete merged Contact De-duplicator (Deduper)

A contacts database (contact_version) may tend to contain a lot of duplicates (dupes). These dupes may be seen by customers when they purchase lists of contacts, and also by people who search the community website. The system's inherent matching and clustering processes will identify such dupes in real time, as they enter the system, and its merge will resolve these dupes.

In more detail, this is expected to work as follows. The normal contact matching and clustering process will also place records that are in the system and are dupes in the same cluster. So a cluster may contain 'external' (partial or complete) records and internal records. A cluster may then be processed as follows.

a) Merge all records in a cluster, regardless of which are 'external' and which are internal.

b) If the merged record m is complete

---

If the cluster contains multiple internal records say J (J is a set of contact_ids)
    Call DB-Merge API to DB-Merge J into m. (DB-Merge operates on contact_version)
    else if the cluster contains one internal record j and m is different from j
        Call DB-Update API to update, in db, internal record j to m.
    else
        Call DB-Add API to add m to internal db.

---

Reaper

In some embodiments, Reaper maintains a repository of facts (e.g., bounce reports) about contacts. There may be processed facts and unprocessed (new) facts. Let F_new denote a set of new facts that arrive in a feed. The processing may be as follows

---

Find all the internal contact_ids C of facts in F_new.
For each contact_id c in C
    F_c = Find ALL facts about c
    Score F_c and decide whether or not to recommend any action about c from the facts in F_c. For this scoring and action processing, certain attributes of c as currently in the internal database are also used, e.g., whether the contact is currently live or dead.
End
Mark all facts in F_new as processed.

---

Some actions may include (i) graveyard a live contact, (ii) ask community whether live contact may be graveyarded, (iii) ungraveyard a dead contact, etc. Facts arrive 'continuously'. All facts need to be retained, and made easily accessible, since any of them could be of use in new decisions. (If forced to, one can come up with sensible heuristics to purge certain facts, e.g., especially old ones, but this ought to be a last resort.) A lot of facts (and other needed data) can accumulate in a, say 6-month, period of time—more than might fit into 32 G of memory.

As new facts arrive, they need to be matched up against known facts for the same contacts. Currently this is done by first finding the contact_id of a new fact, then finding all known facts for that contact_id. A more direct approach, which fits easily and readily in the new technology is to match up new facts directly against old facts for the same attribute (e.g., email) using information that is in the facts themselves. This will, for example, allow reaper to maintain information about emails that may not yet be in the database. This allows us to score records being considered for entry into the database for whether they are dead or alive. The effectiveness of this will be limited only by our ability to get facts about as many emails as one can.

All facts will be stored in the cache, and into certain indices. For now, at least the (exact) email index. (This is because nearly all the facts that the production reaper is currently using to graveyard contacts are based on bounce reports or other feedback about emails.) The phone index is probably the next important index.

New facts in a feed may be processed as follows: (1) add all new facts to the cache; (2) place all new facts to their appropriate clusters; (3) reprocess any clusters that have changed.

In the above, a cluster denotes all facts about the same contact (more precisely, about the same attribute, e.g., email) together with the contact (if there is one) with the same value of the attribute. New facts are placed into their correct clusters via the same matching and clustering meta-algorithms described in Sections 4.2.3 and 4.4. Below is a self-contained description, illustrated for the case of email facts.

Let f_new denote a new email fact.

---

F_match = EXACT_EMAIL_IDX.look_up(f_new.email) // Looks up all records in cache having same email
C = Insert(f_new,cluster of F_match) // C is the modified cluster
Reprocess(C) using the reaper scoring and acting algorithm.

---

It is assumed that EXACT_EMAIL_IDX.look_up (f_new.email) may return not only facts with the same email but also the contact record with the same email.

Database Design

Figure 5:
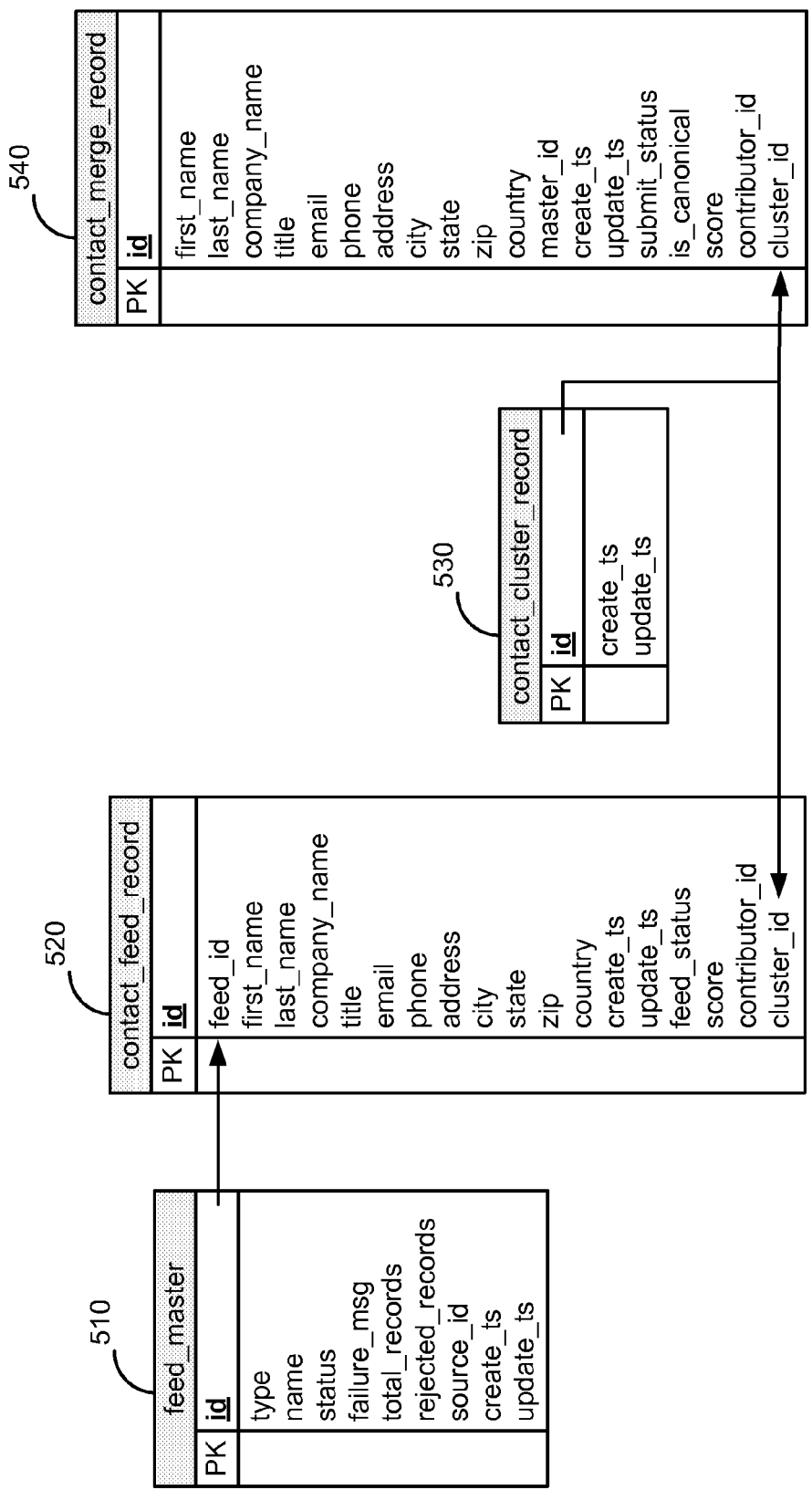
FIG. 5 is a diagram of data structures for tables, according to some example embodiments.

FIG. 5 illustrates an example data design, wherein incoming records from a feed are related to a contact. Table 510 ("feed_master") stores general information related to a feed. Table 520 ("contact_feed_record") stores information related to individual records from the feed, wherein a record contains information related to a contact. Since a record from the feed may be either partial or complete, not all fields are necessarily populated. Table 530 ("contact_cluster_record") stores information related to a cluster. Table 540 ("contact_merge_record") stores information related to an existing record in the cache.

In some embodiments, the primary key for Table 510 is a unique feed ID. Table 510 may include a feed type; in some embodiments, feed type may indicate that the feed is related to a contact or related to a company. Table 510 may also include information related to the feed's name, status, and other administrative data.

In some embodiments, the primary key for Table 520 is a unique record ID associated with the record from the feed. Table 520 may include the ID of the source feed. Table 520 may also include information related to the contact's name, company name, title, email address, phone number, street address, and other administrative data. Table 520 may also include a confidence score for the overall feed record, or a confidence score for each feature of the record.

In some embodiments, the primary key for Table 530 is a cluster ID. The cluster ID provides a way to associate records from the feed with existing records in the system. For this purpose, both Table 520 and Table 540 may include a cluster ID field.

In some embodiments, the primary key for Table 540 is a unique record ID associated with the existing record. Table 540's structure may be fairly similar to that of Table 520. Table 540 may also include a confidence score for the existing record as a whole, as well as a flag indicating whether or not the record has scored highly enough to be marked as being of high quality, i.e., canonical.

Split Clusters

Ideally, all the records that belong together may go into the same cluster and not become split across multiple clusters. A split cluster problem may happen when a true cluster C is represented (as an artifact of the processing, or for other reasons) by multiple clusters C1, . . . , Ck, k>=2. That is, C is the union of C1, . . . , Ck.

For example, suppose two records r1 and r2 are (adjacent) in a feed of external records. Assume r1 and r2 are true matches to each other, and to no other records in the cache (or in the feed). Assume that r1 and r2 are processed, approximately in parallel, by two separate threads, and FindMatchingRecords is run on each. Since neither r1 nor r2 are (as yet) exist in the cache, a race condition arises, and FindMatchingRecords does not return any matches in either instance, so both {r1} and {r2} get put into their own clusters {r1} and {r2} respectively.

Split clusters can arise in other ways. Suppose there are two feeds f1 and f2, both processed in parallel. Suppose f1 contains a record r1, f2 contains r2 and r1 and r2 may be placed in the same cluster. The race condition mentioned above may occur here as well. (The chances are very slim though, because the chance that the two feeds being processed have two 'dupe' records r1 and r2 and that their processing is done at the same time to create a race condition is very low.)

There is at least one other way that split clusters may arise. This is illustrated by the following example. Suppose two partial records are received:
r1=john doe, 123-456-7890, janitor
r2=john doe, jdoe@xyz.com, tampa bay, FL Further, assume that there are no other records currently in the cache that are a (true) match to r1 or r2. In this case, it may make sense to put r1 and r2 into their own singleton clusters. Now, suppose a third record is received:
r3=john doe, 123-456-7890, jdoe@xyz.com Ideally, one would merge r1's and r2's clusters to form a single cluster {r1,r2,r3}, from which the merged record would be produced.
m=john doe, 123-456-7890, jdoe@xyz.com, janitor, tampa bay, FL The proposed solution involves the following changes to the current algorithm (sections 4.2.3 and 4.3). First, modify FindMatchingRecords so that it finds ALL records in the cache that are a true match to r. This is easily done, by an easy modification to the current FindMatchingRecords pseudo-code (section 4.2.3.1). Second, replace the ClusterProcessor (M,r) in Section 4.3 with the one below.

```
ClusterProcessor(M,r)
    If M is empty
        c = new cluster
        Insert(r,c)
        return
    end
    Let C = { m.cluster_id | m in M} denote the set of clusters in M.
    If |C| > 1
        Create a new cluster d = union of all clusters in C.
        Delete every cluster in C.
    Else
        d = C[0] // C[0] is the first, and only, cluster in C.
    End
    // Insert (r,d)
End
```

Note that so long as is_true_positive( . . . ) has an extremely low (if not zero) false positive rate—an assumption around which the entire matching algorithm in this document is built—the modified version of ClusterProcessor(M,r)—unioning multiple clusters in M—is exactly the right thing to do.

The modification in step 1—find ALL matching records—will ensure that all clusters in the cache connectible (i.e., mergeable) via a new record r will get found (and so merged).

Note that Insert(r,d) has been commented out in ClusterProcessor. To understand this, one needs to understand the proposed changes to cluster records within a feed in a way that avoids the race condition mentioned at the top of Section 12.1.

The above changes, when combined with the additional changes below, also address the "race condition problem", at the level of a feed (records in the feed that belong to the same cluster may be put in the same cluster). The additional changes required include: (1) placing all feed records in the cache, and assign each to its own new (singleton) cluster; then (2) start the multi-threaded/blocking queue match→cluster→merge chains.

To illustrate how this alleviates the race condition, consider the 'race condition' example described in the second paragraph of section 12.1. This is 'traced below'.

All records in the feed are loaded into the cache and put in singleton clusters.
FindMatchingRecords(r1)=>M={r1,r2}.
ClusterProcessor({r1,r2},r1) merges the clusters {r1} and {r2} into the cluster {r1,r2} and deletes the clusters {H} and {r2}.

Table 10 below illustrates example results of company-.score_fuzzy_match.

TABLE 10

| company 1 | company 2 | match score |
|---|---|---|
| FOUNTAIN PLATING COMPANY INC | Fountain Plating | 1 |
| T & S BRASS | T&S Brass and Bronze Works Inc. | 0.888888889 |
| FARMERS&MERCHANTS BANK | Farmers & Merchants Bank | 0.954545455 |
| STUART C IRBY COMPANY | Stuart C. Irby Co. | 0.9375 |
| HL DEMPSEY CO INC | H L Dempsey Co | 0.961538462 |
| CENTRAL ONE FCU | Central One Federal Credit Union | 0.923076923 |
| MID-SOUTH IEC | Mid-South Independent Electrical Contractors | 0.807692308 |
| INS CTR OF NEW ENGLAND | Insurance Center of New England | 0.795454545 |
| DOHERTY WALLACE ET AL | Doherty Employment Group Inc | 0.210526316 |
| JOHN J CAMPBELL CO INC | John Knox Village Inc. | 0.204545455 |

The threshold was set to 0.7.

Architecture Components

In some embodiments, the architecture may significantly leverage a distributed, replicated, fault tolerant cache. In some embodiments, Oracle Coherence may be used for the underlying implementation. In some embodiments, wherein all data is resident in memory, performance improvements may be facilitated by building a fast cache loader that uses flat files for faster load times. In some embodiments, data is processed via batch processes. In some embodiments, data may be processed in real-time as feeds and new data becomes available. In some embodiments, data is uploaded via files. In some embodiments, data feeds supply from multiple sources:

- File uploads from a community or administrative website—users may be able to upload files containing information regarding contacts. Such files may be either batch-processed or processed in real-time.
- Real-time contact information additions or updates from a community website—users may be able to utilize an online user interface to add or update contacts. In a typical embodiment, such additions or updates are processed in real-time.
- Affiliate databases—the system may also pull data or accept pushed data from other related databases that may or may not be externally hosted
- Reaper—the system may be able to accept automatic failure notifications (e.g., bounced email reports) to update contacts Configuration properties In some embodiments, entity-based data may go through one or more normalization routines that compute the indices to be used for fast matching and clustering. In some embodiments, the cluster-formation functionality may use hash map based key indices for matching instead of Tree Map. In some embodiments, test data sets may be added to judge the effectiveness of the algorithms and throughput rate of the system.

Cache Manager Interface

In some embodiments, the cache may initially be populated from information contained in a database. In some embodiments, a cache loader is utilized to accomplish batch uploading of records into the cache. This can also be done in a distributed environment. In some embodiments, database tables such as those in Table 1 may act as reference sources of information.

Cache Design—Sources

In some embodiments, the cache may initially be populated from information contained in a database. In some embodiments, a cache loader is utilized to accomplish batch uploading of records into the cache. This can also be done in a distributed environment. In some embodiments, database tables such as those in Table 1 may act as reference sources of information.

TABLE 1

| | |
|---|---|
| Contact_version | All versions of contacts will be retrieved |
| Company1 | Company Information will be retrieved for matching and referencing |
| Location | |
| Domains | |
| Industry_category | |
| Sub_category | |
| User_contact | User contact queue |
| Raw_data | All tables that contain data from file uploads? |

In some embodiments, every record from the system may be captured in a Record object before it is put in the cache (e.g., a row in contact_version or a company 'record' may be formed by joining data about a company known from various company tables). In some embodiments, a single Record object may capture every type of record: a contact record, a partial record, a complete record, a merged record, a row in contact_version, a company record, etc. A Record object may be represented as a set of key-value pairs. This allows the system to use a Record object to represent a wide variety of records, such as those noted above, as well as represent varying attributes on the same record (e.g., one Contact record may have a known direct phone, but another may not) in the same object structure.

In some embodiments, a Record object may have keys (attributes or fields), such as those described in Table 2. In some embodiments, a Record object may have also have keys such as contact_id, rating, and version.

TABLE 2

| | | |
|---|---|---|
| ID | long | Primary Key of record in the database |
| type | enum | e.g., Contact record, Company record, Jigsaw contact record, Jigsaw company record |
| m_KeyMap | Hashmap | HashMap of key-value pairs that contains the data attributes. Values can be primitive types or complex such as collections. |
| m_keyScoreMap | Hashmap | Hashmap of key-value pairs containing score for each key |
| overall_score | int | Overall Score of the Record quality (0 . . . 100) |
| contributor_score | int | Overall Score of contributor who provided record (0 . . . 100) |
| cluster_id | long | Id of Cluster the record is bound to |
| isCanonicalized | boolean | Is Record complete/merged/ready for consumption? |
| isConsumed | boolean | Is Record in DB? All records that are already in the database may have this set to true. |

Table 3 describes an example instance of a Record object.

TABLE 3

| | | |
|---|---|---|
| id | 1 | |
| type | 1 | Contact record |
| m_KeyMap | Hashmap | first_name : Pawan |
| | | last_name: Nachnani |
| | | title: Architect |
| | | version: 1 |
| | | company_id: 100 |
| | | company_Name: Jigsaw |
| | | phone: 510-555-1212 |
| | | email:pnachnani@jigsaw.com |
| | | address:{ |
| | |     address[0]:{ |
| | |       type: BUSINESS |
| | |       addressline1: 64, Zoo Lane |
| | |       city: Fremont |
| | |       state: CA |
| | |       zip:94560 |
| | |     } |
| | | } |
| m_keyScoreMap | Hashmap | first_name : 100 |
| | | last_name: 100 |
| | | title: 100 |
| | | version: 1 |
| | | company_id: 100 |
| | | company_Name: 100 |
| | | phone: 50 |
| | | email:100 |
| | | address: 90 |

TABLE 3-continued

| | | |
|---|---|---|
| overall_score | 99 | |
| contributor_score | 99 | |
| cluster_id | 1 | |
| isCanonicalized | Y | May move this to merge or cluster |
| isConsumed | Y | All records that are already in database may have this set to true. |

Cache Design—Indices

In some embodiments, the following indices may be created for each record in the cache. Table 4 lists some indices that may be used for contact matching or company matching.

TABLE 4

| | | |
|---|---|---|
| RECORD_ID_IDX | The primary key index of each Record | The Record object |
| EMAIL_IDX | Email of each record | Collection of Record IDs |
| NAME@DIRECT-PHONE_IDX | Normalized Name + Normalized Phone # of each record where phone is a direct phone | Collection of Record IDs |
| NAME@COMPANY_IDX | Normalized Name + @Normalized Company for each record | Collection of Record IDs |
| CLUSTER_ID_IDX | The Primary Key Index of each Cluster | The Cluster object |

In some embodiments, a method normalize_phone(p) may produce a set of normalized versions of p, specifically, for US phones {n_p, n6p} where n_p is a normalized version of p, and n6p is the first six digits of n_p. Attributes may also be stored with respect to a phone number, such as whether it is the corporate phone, a direct phone, and, in the latter case, the number of contacts sharing that phone.

In some embodiments, additional indices may include:

| | | |
|---|---|---|
| DOMAIN_IDX | domain | company record ID having that domain |
| DIRECT_PHONE_IDX | Normalized phone which happens to be direct | |
| NAME@CORPORATE_PHONE_IDX | Normalized phone | |
| MANUFACTURED-EMAIL_IDX | Manufactured email | All records whose manufactured email is this |
| CORPORATE_PHONE_IDX | Normalized phone | |
| COMPANY_PREFIX_IDX | Normalized company | |
| STOCK_TICKER_IDX | | |

In some embodiments, these indices may form a core set of indices. Additional indices may be added as needed for matching or other applications. In some embodiments, other plausible indices include: UNAME_IDX Non-normalized Name (may comprise a collection of Record IDs) and NAME@TITLE_RANK_IDX Normalized Name+Title Rank (may comprise a collection of Record IDs).

In some embodiments, all records that are deemed to be associated with the same entity may be put into a Cluster object. (For example, all records representing the same person may be put in the same cluster.) In some embodiments, the Cluster object is a transient, in-memory only object that is used by the Cluster Processor for additional processing. Table 5 describes one example embodiment of a Cluster object.

TABLE 5

| | | |
|---|---|---|
| id | long | Primary Key of cluster in memory |
| m_RecordMap | Hashset | HashSet of similar Record IDs |
| cluster_score | int | Overall Score of the Cluster quality (0 . . . 100) |

TABLE 5-continued

| | | |
|---|---|---|
| merge_time | timestamp | Last time the Merge Processor inspected the cluster |
| modify_time | timestamp | Last time the cluster was modified |

For example, consider a contact_version contact whose contact_id is c. Each contact_version row for this contact will become a Record object. The set of all rows in contact_version for contact_id=c will become a cluster and its cluster_id will be 'c'.

Cache Design—Objects

In some embodiments, certain entities, such as those listed in Table 6, may be continuously resident in cache.

TABLE 6

| | |
|---|---|
| RECORD_CACHE | Cache of all Records |
| CLUSTER_CACHE | Cache of all Clusters. This is an in-memory cache that does not need to be persisted on disk or database (DB). |
| MERGE_CACHE | Cache of clusters that contain merge records that are ready for consumption. This is an in-memory cache that does not need to be persisted on disk or DB. |

Cache Design—Key Normalizers

In some embodiments, normalizing functions, such as those listed in Table 7, may be applied to each attribute or field in the record before the above indexes are created.

TABLE 7

| | |
|---|---|
| First Name Synonym Expansion | Bob -> Bob, Rob, Robert, Bobby, Robby |
| Hyphenated Names | |
| Consonant Normalization | |

TABLE 7-continued

| | |
|---|---|
| Prefix Normalization | |
| Suffix Normalization | |
| Accent Normalization | |
| Whitespace Normalization | |
| Company Synonym Expansion | IBM -> International Business Machines ORCL -> Oracle Corporation INKTOMI -> YAHOO Note that 'synonyms' include merged company pairs and also (parent, child) company pairs |
| Prefix Additions | |
| Stock Ticker Normalization | |
| Prefix Normalization | |
| Suffix Normalization | |
| Acronym Normalization | |
| Hyphenated Names | |
| ISDN Normalization | |
| US, Canada Phone Normalization | |
| Six Digit Normalization | |

In some embodiments, acronym normalization may be an automated procedure to generate an acronym of a company name, regardless of whether or not the company name has a commonly-known acronym.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" may be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Moreover, unless specifically stated otherwise, the terms "first," "second," "third," and the like do not necessarily imply an order or sequence. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It may be understood that any of the embodiments of the present invention can be implemented in the form of control logic using hardware and/or using computer software in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system may include a monitor, printer, or other suitable display for providing any of the results mentioned herein to a user.

Any of the methods described herein may be totally or partially performed with a computer system including a processor, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A computer-implemented method of matching and merging records, the method comprising:
    receiving a plurality of records from an external update feed, wherein a record in the plurality of records from the external update feed may be either partial or complete;
    determining, using a processor, that one or more records in the plurality of records from the external update feed match an existing record, wherein the determining is based on fuzzy matching of normalized fields of the one or more records and the existing record;
    merging, using the processor, the one or more matching records with the existing record into a composite record;
    determining, using the processor, that one or more fields of the composite record are incomplete;
    enriching the composite record by adding information to the incomplete fields in response to determining that the one or more fields of the composite record are incomplete, the information added to the incomplete fields is based on information in other fields of the composite record; and
    storing the composite record.

2. The method of claim 1, wherein the existing record is associated with a cluster, further comprising associating the one or more matching records with the cluster.

3. The method of claim 1, wherein fuzzy matching comprises determining that both the identified one or more records and the existing record are associated with the same contact or that both the identified one or more records and the existing record are associated with the same company.

4. The method of claim 1, wherein fuzzy matching comprises determining that the identified one or more records are associated with a contact, that the existing record is associated with a company, and that the contact is associated with the company.

5. The method of claim 1, further comprising:
    determining, using the processor, a weighted confidence score for a feature of the composite record.

6. The method of claim 5, wherein a feature of the composite record comprises recency, title rank, title quality, domain-specific email pattern, domain-independent email pattern, phone number, first name, last name, or area code-state consistency.

7. The method of claim 5, further comprising:
    determining, using the processor, an overall confidence score for the composite record, wherein the overall confidence score for the composite record is based on weighted confidence scores for one or more features of the composite record;
    determining that the overall confidence score meets a predetermined threshold; and
    designating the composite record as high-quality.

8. The method of claim 7, further comprising storing the composite record designated as high-quality in persistent storage.

9. A system for matching and merging records, the system comprising:
    a processor;
    a network interface; and
    a memory encoded with program code to be executed by the processor, comprising:
        program code to receive a plurality of records from an external update feed, wherein a record in the plurality of records from the external update feed may be either partial or complete;
        program code to determine that one or more records in the plurality of records from the external update feed match an existing record, wherein the determining is based on fuzzy matching of normalized fields of the one or more records and the existing record;
        program code to merge the one or more matching records with the existing record into a composite record;
        program code to determine that one or more fields of the composite record are incomplete;
        program code to enrich the composite record by adding information to the incomplete fields in response to determining that the one or more fields of the composite record are incomplete, the information added to the incomplete fields is based on information in other fields of the composite record; and
        program code to store the composite record.

10. The method of claim 9, wherein the existing record is associated with a cluster, the memory encoded with program code further comprising program code to associate the one or more matching records with the cluster.

11. The system of claim 9, wherein fuzzy matching comprises determining that both the identified one or more records and the existing record are associated with the same contact or that both the identified one or more records and the existing record are associated with the same company.

12. The system of claim 9, wherein fuzzy matching comprises determining that the identified one or more records are associated with a contact, that the existing record is associated with a company, and that the contact is associated with the company.

13. The system of claim 9, the memory encoded with program code further comprising:
    program code to determine, using the processor, a weighted confidence score for a feature of the composite record.

14. The system of claim 13, wherein a feature of the composite record comprises recency, title rank, title quality, domain-specific email pattern, domain-independent email pattern, phone number, first name, last name, or area code-state consistency.

15. The system of claim 13, the memory encoded with program code further comprising:
    program code to determine, using the processor, an overall confidence score for the composite record, wherein the overall confidence score for the composite record is based on weighted confidence scores for one or more features of the composite record;
    program code to determine that the overall confidence score meets a predetermined threshold; and
    program code to designate the composite record as high-quality.

16. The system of claim 15, the memory encoded with program code further comprising program code to store the composite record designated as high-quality in persistent storage.

17. A non-transitory computer-readable medium containing program code executable by a processor in a computer to match and merge records, the program code including instructions to:
    receive a plurality of records from an external update feed, wherein a record in the plurality of records from the external update feed may be either partial or complete;
    determine, using a processor, that one or more records in the plurality of records from the external update feed match an existing record, wherein the determining is based on fuzzy matching of normalized fields of the one or more records and the existing record;
    merge, using the processor, the one or more matching records with the existing record into a composite record;
    determine, using the processor, that one or more fields of the composite record are incomplete;
    enriching the composite record by adding information to the incomplete fields in response to determining that the one or more fields of the composite record are incomplete, the information added to the incomplete fields is based on information in other fields of the composite record; and
    store the composite record.

18. The non-transitory computer-readable medium of claim 17, wherein the existing record is associated with a cluster, further including instructions to associate the one or more matching records with the cluster.

19. The non-transitory computer-readable medium of claim 17, wherein fuzzy matching comprises determining that both the identified one or more records and the existing record are associated with the same contact or that both the identified one or more records and the existing record are associated with the same company.

20. The non-transitory computer-readable medium of claim 17, wherein fuzzy matching comprises determining that the identified one or more records are associated with a contact, that the existing record is associated with a company, and that the contact is associated with the company.

21. The non-transitory computer-readable medium of claim 17, further including instructions to:
    determine, using the processor, a weighted confidence score for a feature of the composite record.

22. The non-transitory computer-readable medium of claim 21, wherein a feature of the composite record comprises recency, title rank, title quality, domain-specific email pattern, domain-independent email pattern, phone number, first name, last name, or area code-state consistency.

23. The non-transitory computer-readable medium of claim 21, further including instructions to:
   determine, using the processor, an overall confidence score for the composite record, wherein the overall confidence score for the composite record is based on weighted confidence scores for one or more features of the composite record;
   determine that the overall confidence score meets a predetermined threshold; and
   designate the composite record as high-quality.

24. The non-transitory computer-readable medium of claim 23, further including instructions to store the composite record designated as high-quality in persistent storage.

* * * * *